US008630310B2

(12) United States Patent
Sethakaset et al.

(10) Patent No.: US 8,630,310 B2
(45) Date of Patent: Jan. 14, 2014

(54) WIRELESS TRANSMISSION OF LAYERED SIGNALS IN A RELAY NETWORK

(75) Inventors: Ubolthip Sethakaset, Singapore (SG);
Quee Seng Tony Quek, Singapore (SG);
Sumei Sun, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 105 days.

(21) Appl. No.: 13/203,716

(22) PCT Filed: Feb. 26, 2010

(86) PCT No.: PCT/SG2010/000066
§ 371 (c)(1),
(2), (4) Date: Aug. 26, 2011

(87) PCT Pub. No.: WO2010/098725
PCT Pub. Date: Sep. 2, 2010

(65) Prior Publication Data
US 2011/0305144 A1 Dec. 15, 2011

(30) Foreign Application Priority Data
Feb. 27, 2009 (SG) .................................. 200901441

(51) Int. Cl.
*H04J 3/16* (2006.01)
(52) U.S. Cl.
USPC ............................ 370/469; 370/315; 370/259
(58) Field of Classification Search
None
See application file for complete search history.

(56) References Cited

U.S. PATENT DOCUMENTS

| 7,929,930 | B2 * | 4/2011 | Sivanesan et al. | 455/185.1 |
| 8,054,870 | B2 * | 11/2011 | Gresset et al. | 375/219 |
| 8,064,823 | B2 * | 11/2011 | Hottinen et al. | 455/11.1 |
| 8,149,756 | B2 * | 4/2012 | Hottinen | 370/315 |
| 2007/0155338 | A1 | 7/2007 | Hong et al. | |
| 2008/0207117 | A1 | 8/2008 | Lim et al. | |
| 2008/0247478 | A1 | 10/2008 | Lee et al. | |
| 2009/0129496 | A1 * | 5/2009 | Zhang et al. | 375/262 |
| 2010/0022184 | A1 * | 1/2010 | Khoshnevis et al. | 455/7 |
| 2010/0232345 | A1 * | 9/2010 | Tsai et al. | 370/315 |
| 2011/0164536 | A1 * | 7/2011 | Lin et al. | 370/259 |
| 2011/0305144 | A1 * | 12/2011 | Sethakaset et al. | 370/246 |
| 2012/0127000 | A1 * | 5/2012 | Yassa | 341/22 |
| 2012/0170619 | A1 * | 7/2012 | Chang et al. | 375/211 |

FOREIGN PATENT DOCUMENTS

| EP | 1 853 004 A1 | 11/2007 |
| EP | 1 912 452 A2 | 4/2008 |
| WO | WO 2009/023238 A1 | 2/2009 |

OTHER PUBLICATIONS

Thomas M. Cover and Joy A. Thomas, "Elements of Information Theory", New York, Wiley, pp. xiii-xviii, 336-349 (1991).

(Continued)

*Primary Examiner* — Robert Wilson
(74) *Attorney, Agent, or Firm* — Blakely, Sokoloff, Taylor & Zafman LLP

(57) ABSTRACT

The wireless transmission of layered signals, in a described embodiment, uses multiple relay nodes (304) to implement cooperative diversity. The method includes: (i) receiving layered signals from a source node (300), (ii) receiving, from a destination node (302), a relay allocation parameter to implement a cooperative relay strategy with one or more other relay nodes (304), and (iii) relaying the layered signals to the destination node (302) using the cooperative relay strategy.

21 Claims, 12 Drawing Sheets

(56) References Cited

OTHER PUBLICATIONS

PCT International Search Report for PCT Counterpart Application No. PCT/SG2010/000066 containing Communication relating to the Results of the International Search Report, 3 pgs., (May 6, 2010).

PCT Written Opinion of the International Searching Authority for PCT Counterpart Application No. PCT/SG2010/000066, 4 pgs., (May 6, 2010).

PCT Written Opinion of the International Preliminary Examining Authority for PCT Counterpart Application No. PCT/SG2010/000066, 5 pgs., (Nov. 24, 2010).

Donghee Kim, et al., "Superposition of Broadcast and Unicast in Wireless Cellular Systems", IEEE Communications Magazine, vol. 46, No. 7, pp. 110-117, (Jul. 2008).

James She, et al., "Cooperative Coded Video Multicast for IPTV Services under EPON-WiMAX Integration", IEEE Communications Magazine, vol. 46, No. 8, pp. 104-110, (Aug. 2008).

Yen-Cheng Lai, et al., "Channel Allocation for UMTS Multimedia Broadcasting and Multicasting", IEEE Transactions on Wireless Communications, vol. 7, No. 11, pp. 4375-4383, (Nov. 2008).

Andrew Sendonaris, et al., "User Cooperation Diversity—Part I: System Description", IEEE Transactions on Communications, vol. 51, No. 11, pp. 1927-1938, (Nov. 2003).

Andrew Sendonaris, et al., "User Cooperation Diversity—Part II: Implementation Aspects and Performance Analysis", IEEE Transactions on Communications, vol. 51, No. 11, pp. 1939-1948, (Nov. 2003).

J. Nicholas Laneman, et al., "Cooperative Diversity in Wireless Networks: Efficient Protocols and Outage Behavior", IEEE Transactions on Information Theory, vol. 50, No. 12, pp. 3062-3080, (Dec. 2004).

Karim G. Seddik, et al., "Distortion Exponents for Different Source-Channel Diversity Achieving Schemes over Multi-Hop Channels", Proceedings of the IEEE International Conference on Communications, pp. 969-974, (Jun. 2007).

Deniz Gunduz, et al., "Source and Channel Coding for Quasi-Static Fading Channels", Proceedings of the Asilomar Conference on Signals, Systems and Computers, pp. 18-22, (Nov. 2005).

Charilaos Christopoulos, et al., "The JPEG2000 Still Image Coding System: An Overview", IEEE Transactions on Consumer Electronics, vol. 46, No. 4, pp. 1103-1127, (Nov. 2000).

Heiko Schwarz, et al., "Overview of the Scalable Video Coding Extension of the H.264/AVC Standard", IEEE Transactions on Circuits and Systems for Video Technology, vol. 17, No. 9, pp. 1103-1120, (Sep. 2007).

Farzad Etemadi, et al., "Optimal Layered Transmission Over Quasi-Static Fading Channels", Proceedings of the International Symposium on Information Theory, pp. 1051-1055, (Jul. 2006).

Farzad Etemadi, et al., "Rate and Power Allocation for Layered Transmission with Superposition Coding", IEEE Signal Processing Letters, vol. 14, No. 11, pp. 773-776, (Nov. 2007).

Deniz Gündüz, et al., "Joint-Source—Channel Codes for MIMO Block-Fading Channels", IEEE Transactions on Information Theory, vol. 54, No. 1, pp. 116-134, (Jan. 2008).

Deniz Gündüz, et al., "Source and Channel Coding for Cooperative Relaying", IEEE Transactions on Information Theory, vol. 53, No. 10, pp. 3454-3475, (Oct. 2007).

Yi Zhao, et al., "Improving Amplify-and-Forward Relay Networks: Optimal Power Allocation versus Selection", IEEE Transactions on Wireless Communications, vol. 6, No. 8, pp. 3114-3123, (Aug. 2007).

Peter Larsson, et al., "Large-Scale Cooperative Relaying Network with Optimal Coherent Combining under Aggregate Relay Power Constraints", Proceedings of Future Telecommunications Conference, pp. 166-170, (Dec. 2003).

Yindi Jing, et al., "Network Beamforming using Relays wih Perfect Channel Information", Proceedings of the IEEE International Conference on Acoustics, Speech, and Signal Processing, pp. 473-476, (Apr. 2007).

Ezio Biglieri, et al., "Fading Channels: Information-Theoretic and Communications Aspects", IEEE Transactions on Information Theory, vol. 44, No. 6, pp. 2619-2692, (Oct. 1998).

* cited by examiner

WIRELESS TRANSMISSION OF LAYERED SIGNALS IN A RELAY NETWORK

CROSS-REFERENCE TO RELATED APPLICATIONS

This patent application is a U.S. National Phase application under 35 U.S.C. §371 of International Application No. PCT/SG2010/000066, filed Feb. 26, 2010, entitled WIRELESS TRANSMISSION OF LAYERED SIGNALS IN A RELAY NETWORK, which claims priority to Singapore patent application number 200901441-6, filed Feb. 27, 2009.

FIELD OF THE INVENTION

The present invention relates generally to wireless transmission of layered signals in a relay network, and particularly, but not exclusively, to wireless transmission of layered signals in a relay network using multiple relay nodes implementing a cooperative relay strategy to relay the layered signals from a source node to a destination node.

BACKGROUND OF THE INVENTION

The demand on multimedia applications such as video streaming and Internet Protocol Television (IPTV) over wireless communications has dramatically increased in recent times. A fixed multimedia base rate for transmission over such wireless communications is generally undesirable due to wireless channel conditions that fluctuate much more than wired links, and the resulting low perceptive quality due to service outages.

One way in which to improve the reliability of the transmission of multimedia information between a transmitter and receiver over a wireless network is to implement a coding technique. Examples of coding techniques include multiple description coding (MDC) and successive refinement coding (SRC). In MDC, the video signal is encoded into multiple descriptions at different source coding rates. Each description can be decoded independently, and a better quality of video can be achieved when more descriptions are received correctly. In SRC, the video signal is encoded into multiple layers at different source coding rates, i.e. base and several enhancement layers. At the receiver, an enhancement layer is decoded and successively refines the description in the previous enhancement or base layers as long as the previous layers are received correctly. An example layered coding technique is disclosed for point-to-point Single-Input Single-Output (SISO) and Multiple-Input Multiple-Output (MIMO) systems in "Source and channel coding for quasi-static fading channels," by D. Gündüz and E. Erkip, Proc. Asilomar Conf. on Signals, Systems and Computers, Pacific Grove, Calif., November 2005, pages 18-22.

Assuming that the channel state information (CSI) is available at the receiver but not at the transmitter, in a slow-fading scenario, once a channel is in deep fade, coding no longer helps to increase the reliability of the transmission. In such cases, the natural performance measure becomes the outage probability, which is the probability when the maximum supportable rate is lower than the fixed transmission rate R. Therefore, the performance metric of layered video transmission over wireless communications becomes the expected video distortion. Accordingly, it has become increasingly important to minimize the expected video distortion.

An alternative development to mitigate the undesired effects of fading is by way of diversity techniques, such as antenna diversity and cooperative diversity.

Unlike an antenna diversity system, which employs multiple antennas at the receiver and/or the transmitter, a cooperative diversity system utilizes a relay without requiring multiple antennas at each terminal. A. Sendonaris, E. Erkip, and B. Aazhang in "Source and channel coding for cooperative relaying," IEEE Trans. Inf. Theory, vol. 53, no. 10, pages 3454-3475, October 2007, proposed cooperative source and channel coding using a system consisting of one source node, one relay node and one destination node. The cooperative technique in that proposal related to the single relay node assisting a direct link communication between the source and destination nodes.

SUMMARY OF THE INVENTION

In general terms, the present invention uses layered source coding and multiple relay nodes implementing a cooperative relay strategy to relay layered signals from a source node to a destination node.

According to a first specific expression of the invention, there is provided a method of operating a relay node for wireless transmission of layered signals in a relay network, the method comprising the steps of: (i) receiving layered signals from a source node, (ii) receiving, from a destination node, a relay allocation parameter to implement a cooperative relay strategy with one or more other relay nodes, and (iii) relaying the layered signals to the destination node using the cooperative relay strategy.

With the proposed method as described in the detailed description, layered signals can be relayed from the source node to the destination node using a cooperative technique that not only benefits from improved reliability resulting from layered coding but also does away with the requirement of a direct link between the source node and the destination node. Accordingly, the multiple relay nodes increase the coverage range when the direct link between the source and destination nodes is not available (i.e. by exploiting the relay nodes' spatial diversity) and also enhance the quality of received video signals at the destination node.

Step (ii) of the first specific expression may comprise receiving a transmit power for each of the relay nodes to implement orthogonal amplify-and-forward. Alternatively or additionally, step (ii) may comprise receiving a relay index indicating which one of the relay nodes should be used to implement selective relaying. Further alternatively or additionally, step (ii) may comprise receiving a value for use by each of the relay nodes to calculate their transmit power to implement distributed beamforming.

Advantageously, prior to step (iii), the method comprises selecting one of a plurality of cooperative relay strategies based on the channel state information available at the relay nodes. For example, orthogonal amplify-and-forward or selective relaying may be selected if only backward channel state information is available, whereas distributed beamforming may be selected if backward and forward channel state information for each relay node is available to the respective relay node.

According to a second specific expression of the invention, there is provided a method of processing layered signals received at a destination node from multiple relay nodes, the multiple relay nodes implementing a cooperative relay strategy to relay layered signals from a source node, the method comprising the steps of: (i) determining channel state information from the received layered signals, (ii) determining which one of a plurality of cooperative relay strategies is implemented by the multiple relay nodes, (iii) determining, using the channel state information, a relay allocation parameter to control the cooperative relay strategy implemented by the multiple relay nodes, and (iv) sending the relay allocation parameter to the multiple relay nodes.

Step (iii) of the second specific expression may comprise calculating a transmit power for each of the multiple relay nodes to implement orthogonal amplify-and-forward. Alternatively or additionally, step (iii) may comprise calculating a relay index indicating which one of the multiple relay nodes should be used to implement selective relaying. Further alternatively or additionally, step (iii) may comprise calculating a value for use by each of the multiple relay nodes to calculate their transmit power to implement distributed beamforming.

Advantageously, the method further comprising the steps of: (v) determining if there has been a change in channel state information, and (vi) if there has been a change in channel state information, determining a resource optimization parameter to control the generation of layered signals at the source node so as to minimize expected distortion at the destination node, and (vii) sending the resource optimization parameter to the source node.

Preferably, the resource optimization parameter comprises a base layer transmission rate, an enhancement layer transmission rate, and one of: channel allocation for the base and enhancement layers, or transmit power for the base and enhancement layers. In one embodiment, step (vi) comprises presetting an outage probability of the enhancement layer, and determining, from the preset outage probability, the base layer transmission rate, enhancement layer transmission rate and one of channel uses and transmit power to be implemented at the source node to minimize expected distortion at the destination node.

Where the layered signals are progressive transmission signals, step (vi) may further comprise: (a) initializing the base layer transmission rate at a minimum transmission rate, (b) determining the enhancement layer transmission rate from the preset outage probability and the base layer transmission rate, (c) determining the channel uses using the determined base layer transmission rate and enhancement layer transmission rate, (d) determining the expected distortion using the determined base layer transmission rate, enhancement layer transmission rate and the channel uses, (e) increasing the base layer transmission rate, (f) repeating steps (b) to (e) until the base layer transmission rate is at a maximum transmission rate, and (g) determining which values of the base layer transmission rate, enhancement layer transmission rate and channel uses result in a minimum expected distortion.

Where the layered signals are superposition coding layered signals, step (vi) may further comprise: (a) initializing the enhancement layer transmission rate at a minimum transmission rate, (b) determining the transmit power using the enhancement layer transmission rate and the preset outage probability, (c) determining the base layer transmission rate, (d) determining the expected distortion using the determined base layer transmission rate, enhancement layer transmission rate and transmit power, (e) increasing the enhancement layer transmission rate, (f) repeating steps (b) to (e) until the enhancement layer transmission rate is at a maximum transmission rate, and (g) determining which values of the base layer transmission rate, enhancement layer transmission rate and transmit power result in a minimum expected distortion.

According to a third specific expression of the invention, there is provided a method of wireless transmission of layered signals in a relay network, the method comprising the steps of: (i) transmitting layered signals from a source node to multiple relay nodes, (ii) relaying the layered signals from the multiple relay nodes to a destination node using a cooperative relay strategy, (iii) receiving the layered signals at the destination node from the multiple relay nodes, (iv) determining, from the received layered signals, relay allocation information indicative of a transmit power of each relay node or indicative of the appropriate relay node to use in step (ii) to minimize distortion of the received layered signals, (v) determining, from the received layered signals, resource optimization information indicative of a transmission rate, channel uses or transmit power of the source node to minimize distortion of the received layered signals, (vi) transmitting the relay allocation information to the multiple relay nodes, and (vii) transmitting the resource optimization information to the source node.

Preferably, step (ii) comprises implementing one of: orthogonal amplify-and-forward, selective relaying and distributed beamforming.

Advantageously, the layered signals comprise a base layer and an enhancement layer, and step (v) comprises presetting an outage probability of the enhancement layer, and determining, from the preset outage probability, the base layer transmission rate, enhancement layer transmission rate and one of channel uses and transmit power to be implemented by the source node to minimize expected distortion at the destination node.

Where the layered signals are progressive transmission signals, step (v) may further comprise: (a) initializing the base layer transmission rate at a minimum transmission rate, (b) determining the enhancement layer transmission rate from the preset outage probability and the base layer transmission rate, (c) determining the channel uses using the determined base layer transmission rate and enhancement layer transmission rate, (d) determining the expected distortion using the determined base layer transmission rate, enhancement layer transmission rate and channel uses, (e) increasing the base layer transmission rate, (f) repeating steps (b) to (e) until the base layer transmission rate is at a maximum transmission rate, and (g) determining which values of the base layer transmission rate, enhancement layer transmission rate and channel uses result in a minimum expected distortion.

Where the layered signals are superposition coding layered signals, step (v) may further comprise: (a) initializing the enhancement layer transmission rate at a minimum transmission rate, (b) determining the transmit power using the enhancement layer transmission rate and the preset outage probability, (c) determining the base layer transmission rate, (d) determining the expected distortion using the determined base layer transmission rate, enhancement layer transmission rate and transmit power, (e) increasing the enhancement layer transmission rate, (f) repeating steps (b) to (e) until the enhancement layer transmission rate is at a maximum transmission rate, and (g) determining which values of the base layer transmission rate, enhancement layer transmission rate and transmit power result in a minimum expected distortion.

According to a fourth specific expression of the invention, there is provided an integrated circuit (IC) for a relay node to relay layered signals from a source node to a destination node, the IC comprising: a processing unit configured to receive layered signals from the source node, receive, from the destination node, a relay allocation parameter to implement a cooperative relay strategy with one or more other relay nodes, and relay the layered signals to the destination node using the cooperative relay strategy. Such an IC may be used in a relay station.

According to a fifth specific expression of the invention, there is provided an IC for a destination node to process received layered signals from multiple relay nodes, the IC comprising: a relay allocation processing unit configured to determine the cooperative relay strategy implemented by the multiple relay nodes, determine, using channel state information derived from the received layered signals, a relay allocation parameter to control the cooperative relay strategy, and send the relay allocation parameter to the multiple relay nodes. Such an IC may be used in a communication device.

Preferably, the IC of the fifth specific expression further comprises: a resource optimization processing unit configured to preset an outage probability of an enhancement layer of the layered signals, determine, from the preset outage probability, a base layer transmission rate, enhancement layer transmission rate and one of channel uses and transmit power to be implemented by a source node to minimize expected distortion at the destination node, and send the base layer transmission rate, enhancement layer transmission rate and one of the channel uses and the transmit power to the source node.

There may also be provided a relay node configured to communicate with a plurality of communication devices according to the method of the first specific expression of the invention, and a communication device configured to communicate with a relay node according to the method of the second specific expression of the invention.

BRIEF DESCRIPTION OF THE DRAWINGS

In order that the invention may be fully understood and readily put into practical effect, there will now be described by way of a non-limiting example only, an exemplary embodiment of which the description is provided below with reference to the accompanying illustrative drawings in which.

DETAILED DESCRIPTION OF THE PREFERRED EMBODIMENT

Figure 1:
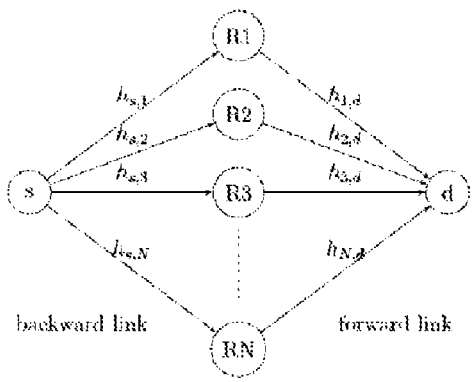
FIG. 1 is a block diagram of a relay network having multiple relay nodes.

The preferred embodiment of the present invention comprises a framework and the corresponding methodology for cooperative wireless video transmissions in a relay network with multiple relay nodes $R_1$-$R_N$ as shown in FIG. 1. The relay nodes are amplify-and-forward (AF) relays and so perform non-regenerative relaying between a source node s and a destination node d. The link between the source node s and the relay nodes $R_1$-$R_N$ is the backward link having a backward link channel gain $h_s$. The link between the relay nodes $R_1$-$R_N$ and the destination node d is the forward link having a forward link channel gain $h_d$. In the following detailed description, it is assumed that perfect instantaneous backward and forward link channel gains $h_s$ and $h_d$ are not available at the source node s, but only at the destination node d.

Figure 2A:
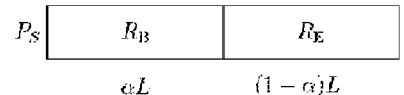
FIGS. 2A and 2B are block diagrams respectively showing the layered video transmission strategies of progressive transmission and superposition coding.
Figure 2B:
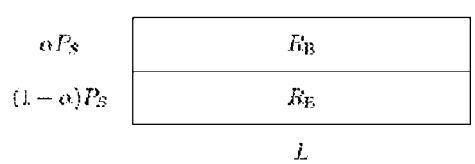

The source node s is configured to implement one of two different layered video transmission strategies: progressive transmission as illustrated in FIG. 2A and superposition coding as illustrated in FIG. 2B. In progressive transmission, layers are transmitted at different rates ($R_B$ and $R_E$) and channel uses ($\alpha L$ and $(1-\alpha)L$) but with the same transmit power ($P_S$). In superposition coding, layers are transmitted at different rates ($R_B$ and $R_E$) and transmit power ($\alpha P_S$ and $(1-\alpha)P_S$) but in the same channel uses (L). It will be appreciated that such layered coding techniques encode the source signal into multiple layers with different significance and the order of decoding is fixed such that the base layer is decoded and enhancement layer is subsequently decoded if the base layer is successfully decoded. Accordingly, "layered signals" as used in this specification are generally referred to when the higher layer has dependencies on its lower layer.

The relay nodes $R_1$-$R_N$ are configured to implement cooperative diversity by way of a cooperative relay strategy depending on the available CSI at the relay nodes. Conventional cooperative diversity involves a cooperative multiple antenna technique for improving or maximising total network channel capacities which exploits user diversity by decoding the combined signal of the relayed signal and the direct signal in a wireless network. In the present invention, the cooperative diversity is implemented from a multiple relay standpoint, and so diversity is achieved by decoding the combined signal of one relayed signal with one or more other relayed signals. A direct signal is therefore not required (although a direct link can be used when it is available). Accordingly, in this specification, 'cooperative relay strategy' and its variants denote a cooperative technique where multiple relay nodes are each configured to relay signals to a destination node so as to allow signals from two or more relay nodes to be used by the destination node for cooperative diversity. Of course where a direct link is available, 'cooperative relay strategy' includes using signals from multiple relay nodes in combination with the direct link signal for cooperative diversity.

Three example cooperative relay strategies that are used in the preferred embodiment are: orthogonal amplify-and-forward (OAF), selective relaying (SEL) and distributed beamforming (DBF). The relay nodes operate by relaying received layered signals from the source node s to the destination node d based on one of the cooperative relay strategies and based on a relay allocation parameter received from the destination node d. This allows the cooperative relay strategy to take into account the CSI that is only available at the destination node d. Details of each of the exemplary cooperative relay strategies will be described later in this specification.

Figure 3:
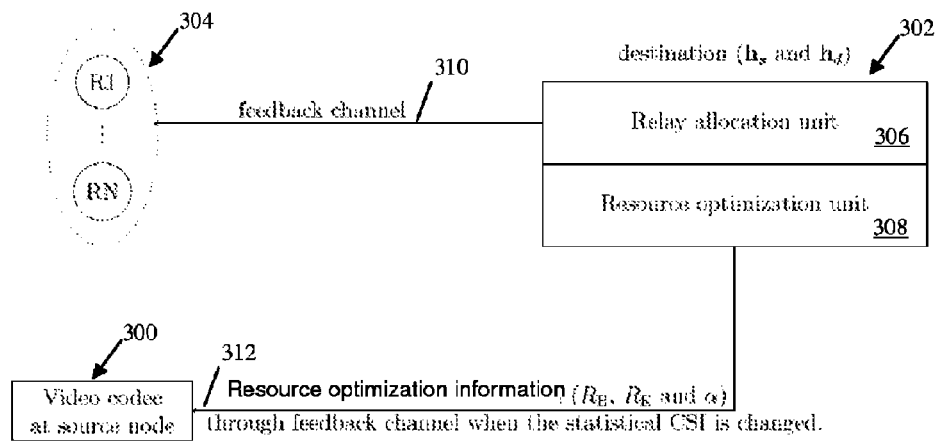
FIG. 3 is a block diagram of a framework illustrating the flow of information via feedback links from the destination node to the source node and to the multiple relay nodes.

Referring to FIG. 3, the flow of information from the destination node 302 to the source node 300 and the relay nodes 304 is shown. Specifically, the destination node 302 includes a relay allocation unit 306 and a resource optimization unit 308. The relay allocation unit 306 functions to determine the CSI and, depending on the cooperative relay strategy being implemented, to determine the relay allocation parameter to be sent back via feedback channel 310 to the relay nodes 304 to control the cooperative relay strategy according to the CSI. The resource optimization unit 308 functions to assess the CSI and, based on the CSI, to assess and send via feedback channel 312 resource optimization parameters relating to rate, power, and channel uses to be used by a video codec at the source node 300 so as to maximize the quality of the reconstructed video at the destination node 302.

A detailed explanation of the methodology carried out at each of the source node, multiple relay nodes and destination node will now be described.

1.0 Source Node—Layered Video Transmission Strategies

Normally, the common term used to evaluate the quality of the received image/video signal at the destination node is peak signal-to-noise ratio (PSNR) defined as $$PSNR = 10\log_{10}\frac{(2^B - 1)^2}{MSE}, \quad (1)$$

where B is the number of bits per pixel and MSE is the mean-squared error between the received image/video compared to the original one. For simplicity, the transmission of a successively refinable, memoryless, zero mean, unit variance complex Gaussian source is considered over a fading channel to the destination. The single-letter squared-error distortion between the source vector $s=[s_1, s_2, \ldots, s_K]^T \in \mathbb{C}^K$ and its reconstruction vector $\hat{s}=[\hat{s}_1, \hat{s}_2, \ldots, \hat{s}_K]^T \in \mathbb{C}^K$ is defined as $$D(s, \hat{s}) = \frac{1}{K}\sum_{k=1}^{K} d(s_k, \hat{s}_k), \quad (2)$$

where $d(s_k, \hat{s}_k) = (s_k - \hat{s}_k)^2$ and K is the source block length. The corresponding distortion-rate function is given by $D(R)=2^{-R}$, where R is the source coding rate in bits per symbol sample. If the source sample is pixel, the unit of the source rate is bits per pixel. Furthermore, a block fading channel model is considered parameterized by a finite and fixed coherence time, details of which are disclosed by E. Biglieri, J. Proakis, and S. Shamai in "Fading channels: Information-theoretic and communications aspects" IEEE Trans. Inf. Theory, vol. 44, no. 6, pp. 2619-2692, October 1998. Specifically, the channel is partitioned into multiple flat fading blocks, where the channel fading coefficient h within each block of length L is constant. Typically, each random channel coefficient can be modeled as a circularly symmetric complex Gaussian random variable (r.v.), i.e., $h \sim \mathcal{CN}(0, 1)$, where $\mathcal{CN}(\mu, \sigma^2)$ denotes a complex circularly symmetric Gaussian distribution with mean $\mu$ and variance $\sigma^2$. It is assumed that a source realization of K symbol samples are encoded and mapped to L channel uses and then transmitted over each of the fading blocks. Therefore, a bandwidth expansion factor can be defined as $$b = \frac{L}{K}\left[\frac{\text{channel uses}}{\text{source symbol sample}}\right], \quad (3)$$

leading to a channel code of rate R/b bits per channel use. It is assumed that L and K are sufficiently large to approach the instantaneous capacity and Gaussian rate-distortion bound.

As highlighted earlier, in a slow-fading scenario, once a channel is in deep fade, coding no longer helps to increase the reliability of the transmission. In such cases, the natural performance measure becomes the outage probability (assuming, as before, perfect CSI is not available at the source, but only at the destination). For an arbitrary fixed transmission rate of R/b bits/channel use, the outage probability is $\mathbb{P}(I(h) < R/b)$ where I(h) is the maximum rate supportable by the channel h.

Adopting a layering transmission approach, the video source is encoded into two layers, namely base and enhancement layers with transmission rates of $R_B$ and $R_E$ respectively, such that the enhancement layer successively refines the description in the base layer as long as the base layer is received correctly. In the following description, details of two different layered-video transmission strategies (progressive transmission and superposition coding) are considered.

1.1 Progressive Transmission

In progressive transmission, the L channel uses are divided into two portions as shown in FIG. 2A. The base layer is transmitted in the first $\alpha L$ channel uses at a transmission rate $R_B$, where $\alpha$ is real and $\alpha \in (0, 1)$. Then, the enhancement layer is transmitted in the rest of the channel uses at a transmission rate $R_E$.

At the destination node, the received video signal is obtained by first decoding the base layer followed by the enhancement layer from the associated channel uses. Therefore, the overall expected distortion ($\epsilon_D$) is given by $$\epsilon_D = (1-P_E)D(\alpha b R_B + (1-\alpha)b R_E) + (P_E - P_B)D(\alpha b R_B) + P_B, \quad (4)$$

where D(R) denotes rate-distortion function corresponding to the encoding rate R. $P_B$ and $P_E$ denote the outage probabilities associated with the base and enhancement layers respectively. In case of base layer outage, the receiver simply outputs the average value of the source distribution, i.e., the highest possible distortion of one.

1.2 Superposition Coding

In superposition coding, the video layers are transmitted by superimposing the enhancement layer at a rate $R_E$ with the base layer at a rate $R_B$, as shown in FIG. 2B. The transmission power $\alpha P_S$ and $(1-\alpha)P_S$ denote the power levels allocated to the base and enhancement layers respectively, where $P_S$ denotes the source power constraint such that $\alpha \in (0, 1]$.

At the destination, successive decoding is performed under perfect knowledge of CSI. Moreover, the decoding order is fixed such that the receiver will always try to decode the base layer first by assuming that the enhancement layer is noise. After that, the enhancement layer is decoded by first removing the base layer from the received signal. Therefore, the overall expected distortion ($\epsilon_D$) is given by $$\epsilon_D = (1-P_E)D(bR_B + bR_E) + (P_E - P_B)D(bR_B) + P_B. \quad (5)$$

2.0 Relay Nodes—Multiple-Relay Cooperative Strategies

The considered system model is a multiple-relay network comprising of N+2 nodes, i.e. one source, one destination and N relay nodes. A schematic is illustrated in FIG. 1. The relay nodes are used to assist the layered video transmission from the source node to the destination node where a direct link between the source node and the destination node is not available. All nodes operate in a common frequency band and are in half-duplex mode.

The channel gain vectors from the source node to the relay nodes, and from the relay nodes to the destination node are denoted as $h_s=[h_{s,1}, h_{s,2}, \ldots, h_{s,N}]^T$ and $h_d=[h_{1,d}, h_{2,d}, \ldots, h_{N,d}]^T$ respectively, where $h_{s,n} \sim \mathcal{CN}(0, \sigma_{s,n}^2)$ and $h_{n,d} \sim \mathcal{CN}(0, \sigma_{n,d}^2)$.

In the first time slot, the source node broadcasts the transmitted signal vector denoted as $x_s=[x_s^{(1)}, x_s^{(2)}, \ldots, x_s^{(L)}]$ to all relay nodes. $x_s$ is either a concatenated signal vector or a superimposed signal vector depending on whether progressive transmission or superposition coding is applied at the source node, and $x_s^{(l)}$ is the transmitted symbol at time l under an average transmission power constraint of $P_S$ where l=1, 2, ..., L. The received signal at the relay nodes can be written as $$y_R^{(l)} = h_s \sqrt{P_S} x_s^{(l)} + z_R^{(l)}, \quad (6)$$

where $y_R^{(l)}$ is the (N×1) l-th received signal vector at the relay nodes and $z_R^{(l)} \sim \tilde{\mathcal{N}}(0, I)$ is the (N×1) l-th noise vector at the relay nodes. $\tilde{\mathcal{N}}(\mu, \Sigma)$ denotes a complex K-variate Gaussian distribution with a mean vector $\mu$ and a covariance matrix $\Sigma$.

For non-regenerative relaying, the relay nodes simply transmit scaled versions of their received signals while satisfying the total relay power constraint ($P_R$), i.e. $\Sigma_{n=1}^{N} P_n = P_R$ where $P_n$ is the power consumption at the n-th relay node. Therefore, the (N×1) l-th transmitted signal vector from the relay nodes to the destination node, $x_R^{(l)}$, is given by $$x_R^{(l)} = G y_R^{(l)}, \quad (7)$$

where G denotes the (N×N) diagonal matrix representing relay gains. The diagonal structure of G ensures that each relay node only requires knowledge about its own received signal.

After processing the received signals, the relay nodes transmit the processed data to the destination node in the subsequent time slots while the source node remains silent. The relay gains and the received signal at the destination node depend on the cooperative relay strategy implemented by the relay nodes.

The following gives details of three considered AF cooperative strategies, namely OAF, SEL, and DBF, which are selected depending on the type of CSI available at the relays. It is assumed that all backward and forward channel gains, i.e. $h_s$ and $h_d$, are perfectly known at the destination node but not at the source and relay nodes. Moreover, perfect synchronization at the destination node is assumed.

Figure 4:
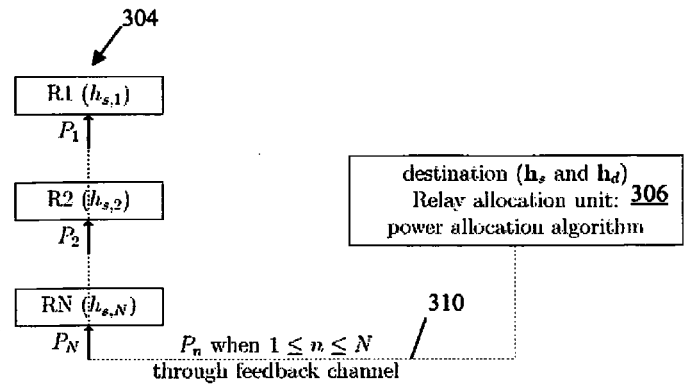
FIG. 4 is a block diagram showing the feedback information flow from the destination node to the multiple relay nodes when orthogonal amplify-and-forward is adopted.

OAF is used where only backward CSI is available at the relay nodes. The transmit power $P_n$ for consumption at the n-th relay is determined by a power allocation algorithm performed at a relay allocation unit in the destination node to minimize the outage probability. This allocated power information is sent back to the relay nodes via the feedback channel 310 as shown in FIG. 4 when the instantaneous CSI is changed.

Figure 5:
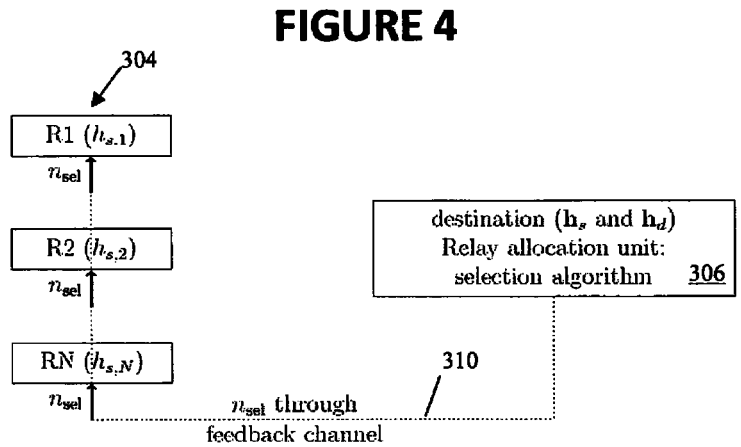
FIG. 5 is a block diagram showing the feedback information flow from the destination node to the multiple relay nodes when selective relaying is adopted.

SEL is also used where only backward CSI is available at the relay nodes. The relay node with the largest product of backward and forward link channel gain forwards its received signal with full relay power constraint while the rest keep silent. The selection is determined at the relay allocation unit implementing a selection algorithm in the destination node, after which a selected relay index $n_{sel}$ is sent back to the relay nodes via the feedback channel 310 as shown in FIG. 5.

Figure 6:
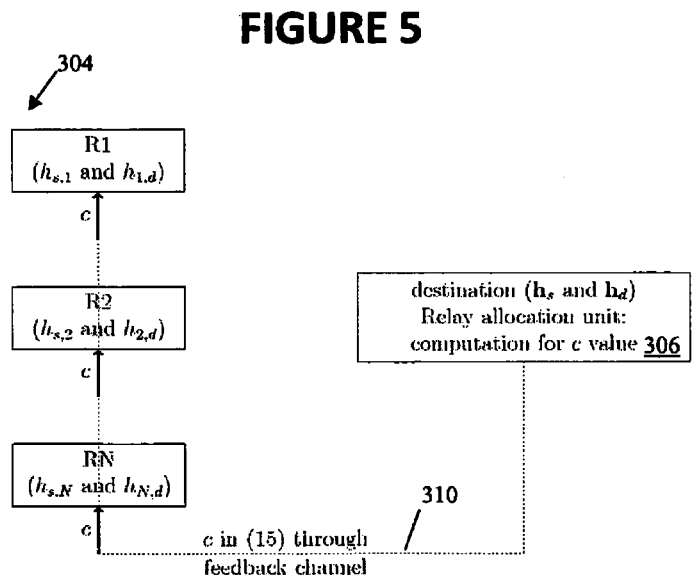
FIG. 6 is a block diagram showing the feedback information flow from the destination node to the multiple relay nodes when distributed beamforming is adopted.

DBF is used where each relay node knows its backward and forward link channel gain but not the global ones. Therefore, the destination node needs to feedback via the feedback channel 310 a constant value c used for calculating the power consumption at the relays as shown in FIG. 6.

2.1 Orthogonal Amplify-and-Forward

In OAF, each relay node transmits its own signal in a different time-slot, i.e. the n-th relay node transmits during the n-th time slot while others keep silent. Therefore, the total time slots for transmitting the video signal from the source node to the destination node is N+1. The l-th received signal at the destination node from the n-th relay node during the n-th time slot can be written as $$y_d^{(l)} = h_{n,d} g_n h_{s,n} x_s^{(l)} + \underbrace{h_{n,d} g_n z_{R,n}^{(l)} + z_d^{(l)}}_{\triangleq \tilde{z}_d^{(l)}}, \quad (8)$$

where $z_{R,n}^{(l)} \sim \mathcal{CN}(0, 1)$ and $z_d^{(l)} \sim \mathcal{CN}(0, 1)$ are the noise at the n-th relay node and the destination node respectively, and $\tilde{z}_d^{(l)}$ represents the effective noise at the destination node. The n-th diagonal element of the relay gain matrix G is given by $$g_n = \sqrt{\frac{P_n}{P_S |h_{s,n}|^2 + 1}}. \quad (9)$$

The optimal power allocation among the relay nodes is obtained by using a water-filling solution (see Y. Zhao, R. Adve, and T. J. Lim, "Improving amplify-and-forward relay networks: optimal power allocation versus selection" IEEE Trans. Wireless Commun., vol. 6, no. 8, pp. 3114-3123, August 2007). The power consumption at the n-th relay node is given by $$P_n = \max\left[0, \left(\sqrt{\frac{P_S^2 |h_{s,n}|^4 + P_S |h_{s,n}|^2}{|h_{n,d}|^2}} \lambda - \frac{P_S |h_{s,n}|^2 + 1}{|h_{n,d}|^2}\right)\right], \quad (10)$$

where $\lambda$ is chosen such that $\Sigma_{n=1}^{N} P_n = P_R$. Here, it is assumed that the backward CSI is available at the relay nodes but not the forward CSI. Thus, the power allocation for each relay node is performed at the relay allocation unit in the destination node and the allocated power information is sent back to the relay nodes from the destination as shown in FIG. 4.

2.2 Selective Relaying

In SEL, the transmission occurs only in two time slots. In the first time slot, the source node broadcasts to all relay nodes (same as OAF). However, only one relay node is chosen to forward the transmitted symbol to the destination node in the second time slot.

At the destination node, the receiver compares which link has the largest product of backward and forward link channel gain, i.e. $|h_{n,d} h_{s,n}|^2$. The relay node that corresponds to the largest product gain is then selected for relay transmission, whereas the unselected relay nodes do not transmit any signals in the second time slot. Without loss of generality, it is assumed that the destination node can send a feedback signal to the relay nodes to indicate which relay has been selected as shown in FIG. 5. The n-th diagonal element of G is then given by $$g_n = \begin{cases} \sqrt{\dfrac{P_R}{P_S|h_{n,e}|^2+1}}, & n = n_{sel}, \\ 0, & \text{otherwise,} \end{cases} \quad (11)$$

where $n_{sel}$ denotes the selected relay node. Therefore, the received signal at the destination node can be written as $$y_d^{(l)} = h_{n_{sel},d} g_{n_{sel}} h_{s,n_{sel}} x_s^{(l)} + \underbrace{h_{n_{sel},d} g_{n_{sel}} z_{R,n_{sel}}^{(l)} + z_d^{(l)}}_{\triangleq \tilde{z}_d^{(l)}}. \quad (12)$$

2.3 Distributed Beamforming

In DBF, it is assumed that the n-th relay node has access to its locally-bidirectional CSI, i.e. $h_{s,n}$ and $h_{n,d}$ and it can perform distributed beamforming.

Each relay node can therefore simultaneously transmit its own signal to the destination node in the second time slot. The n-th diagonal element of G is then given by $$g_n = \sqrt{\dfrac{P_n}{P_S|h_{s,n}|^2+1}} \dfrac{h_{s,n}^*}{|h_{s,n}|} \dfrac{h_{n,d}^*}{|h_{n,d}|}. \quad (13)$$

The optimal relay power allocation is given by $$P_n = \dfrac{1}{c}\left(\dfrac{|h_{s,n}h_{n,d}|^2(1+|h_{s,n}|^2 P_S)}{(|h_{s,n}|^2 P_S + |h_{n,d}|^2 P_R + 1)^2}\right), \quad (14)$$

where $$c = \sum_{n=1}^{N} \dfrac{|h_{s,n}h_{n,d}|^2(1+|h_{s,n}|^2 P_S)}{(|h_{s,n}|^2 P_S + |h_{n,d}|^2 P_R + 1)^2}. \quad (15)$$

In (14), the term in the parenthesis is a function of the relay node's locally-bidirectional CSI and c is the same c for all relay nodes which can be broadcasted from the destination node as shown in FIG. 6. Thus, the relay nodes can calculate their own power consumption. The received signal at the destination can be written as $$y_d^{(l)} = h_d^T G h_s x^{(l)} + \underbrace{h_s^T G z_R^{(l)} + z_d^{(l)}}_{\triangleq \tilde{z}_d^{(l)}}. \quad (16)$$

3.0 Destination Node—Overall Method

Figure 7:
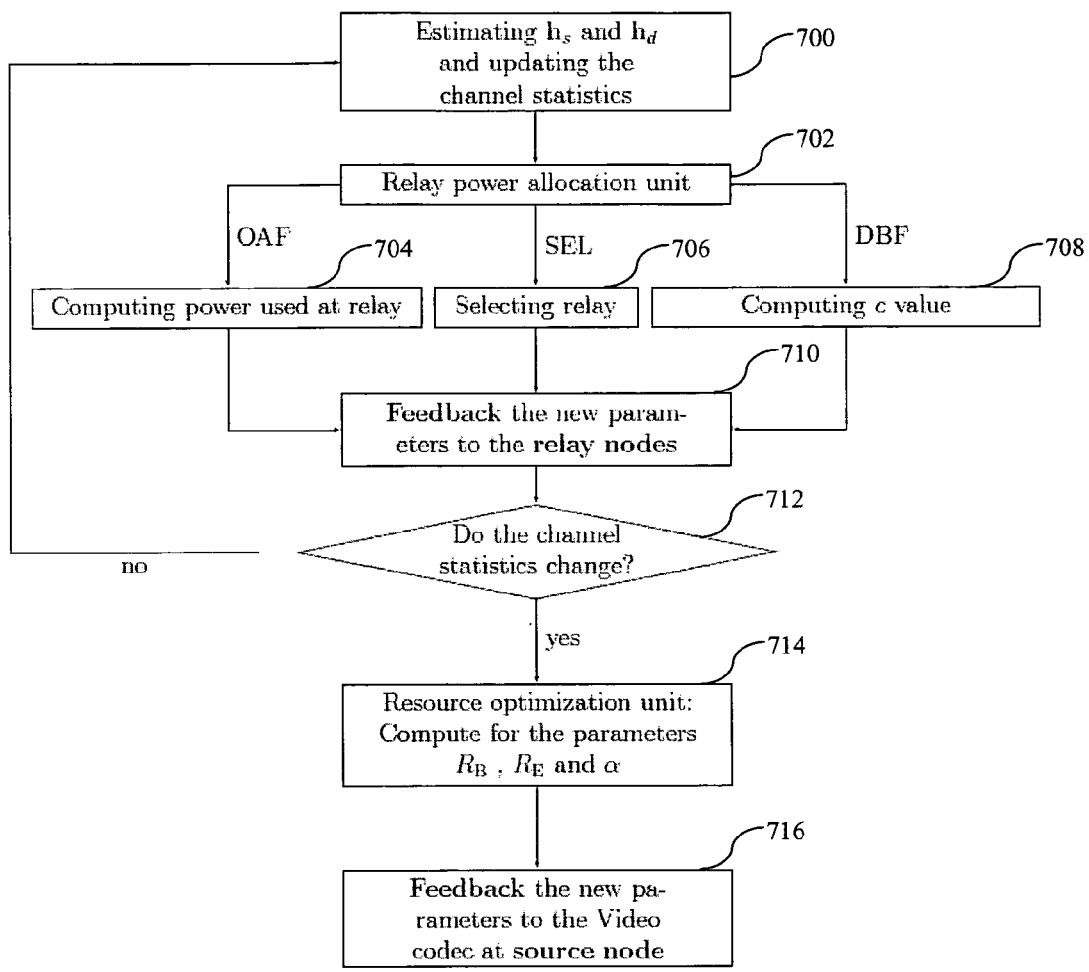
FIG. 7 is a flowchart of the process occurring at the destination node during one channel realization for the proposed framework.

The overall methodology at the destination node is shown in FIG. 7. The method begins with the estimation of the backward and forward channel gains from the received signals in step 700. In step 702, the method proceeds to the relay allocation unit and a determination is made as to the cooperative relay strategy being used by the relay nodes. As outlined earlier, depending on whether OAF, SEL or DBF is employed, the relay allocation unit will determine either the power to be used at the relay nodes (step 704), a relay index to select a particular relay (step 706) or a c value for each relay node to determine their own power use (step 708). Once determined, the relevant relay allocation parameter is sent back to the relay nodes in step 710. In step 712, the destination node monitors to see if there are any changes to the channel statistics (i.e. CSI). If there are changes, the method proceeds to the resource optimization unit in step 714 to compute optimal values for $R_B$, $R_E$ and $\alpha$ (i.e. base layer rate, enhancement layer rate and channel uses/transmit power) for coding at the source node. These resource optimization parameters are then sent back to the video codec at the source node in step 716.

If, in step 712, the destination node determines that there has been no change to the channel statistics, the method proceeds back to step 700 and repeats the above methodology.

3.1 Optimization Framework

As noted earlier, the resource optimization unit functions to compute indications of optimal base layer rate, enhancement layer rate, power and channel uses for use by the source node. This is done to minimize the overall $\epsilon_D$ in (4) and (5) subject to a total source power constraint $P_S$ and total relay power constraint $P_R$ where the outage probabilities of the base and enhancement layers are calculated from the upper bound analysis. This optimization problem can be cast as follows:

$$\min_{\alpha, R_B, R_E} \varepsilon_D(\alpha, R_B, R_E, b, SNR) \quad (17)$$

$$\text{s.t.} \quad \alpha \in (0, 1].$$

However, the optimization problem in (17) is a non-convex optimization problem, which is difficult to solve. As a result, the optimal rate, channel, and power allocation are generally obtained from an exhaustive search with complexity $\mathcal{O}(|\mathcal{A}\| \mathcal{R}^2)$, $\mathcal{A} = [0, \delta_\mathcal{A}, 2\delta_\mathcal{A}, \ldots, 1]$ and $\mathcal{R} = [\mathcal{R}_{min}, \mathcal{R}_{min} + \delta_\mathcal{R}, \mathcal{R}_{min} + 2\mathcal{R} \ldots, \mathcal{R}_{max}]$ are the set of possible $\alpha$ and rates, i.e. $R_B$ and $R_E$, respectively, and $\delta_\mathcal{A}$ and $\delta \mathcal{R}$ are fixed step sizes.

In "Optimal layered transmission over quasi-static fading channels" in Proc. IEEE Int. Symp. on Inform. Theory, Seattle, USA, July 2006, pages 1051-1055, the authors (F. Etemadi and H. Jafarkhani) proposed an iterative algorithm for resource optimization with lower complexity as follows. In the case of progressive transmission, the rate search over the 2-dimensional grid search is replaced with 2 single-dimensional searches and the optimal $\alpha$ in (4) can be calculated from a closed-form function, $f(R_B, R_E)$ when $R_B$ and $R_E$ are given. The authors further applied the proposed rate allocation to the case of superposition coding in "Rate and power allocation for layered transmission with superposition coding" IEEE Signal Process. Lett., vol. 14, no. 11, pp. 773-776, November 2007. The proposed algorithm is the combination between the rate allocation proposed in their 2006 publication and a binary search for a Lagrange multiplier $\lambda \in (0, \lambda_{max})$ for power allocation. With these proposals, the computational complexity was reduced to $\mathcal{O}(2|\mathcal{R}|)$ for progressive transmission and $\mathcal{O}(2|\mathcal{R}| \log(\lambda_{max}/\epsilon))$ for superposition coding, where $\epsilon$ is the desired accuracy to the optimal $\lambda$.

In the present invention, an algorithm is proposed that can further reduce the computational complexity at the destination to $\mathcal{O}(|\mathcal{R}|)$ for both transmission strategies. The main idea is to preset the outage probability of the enhancement layer at a certain value $\gamma$th and then determine the rate, power and channel allocation based on this value. The value of $\gamma$th to be set depends on the video content and transmission strategy. Specifically, the value $\gamma$th depends on the multimedia content and transmission strategy and it can be obtained a priori based on statistical information. Once the optimal rate, power and channel uses are obtained, the destination node sends this resource optimization information to the source node via the feedback channel 312 as shown in FIG. 3. The details of the algorithm for each of progressive transmission and superposition coding are as follows:

3.2 Optimization for Progressive Transmission

Figure 8:
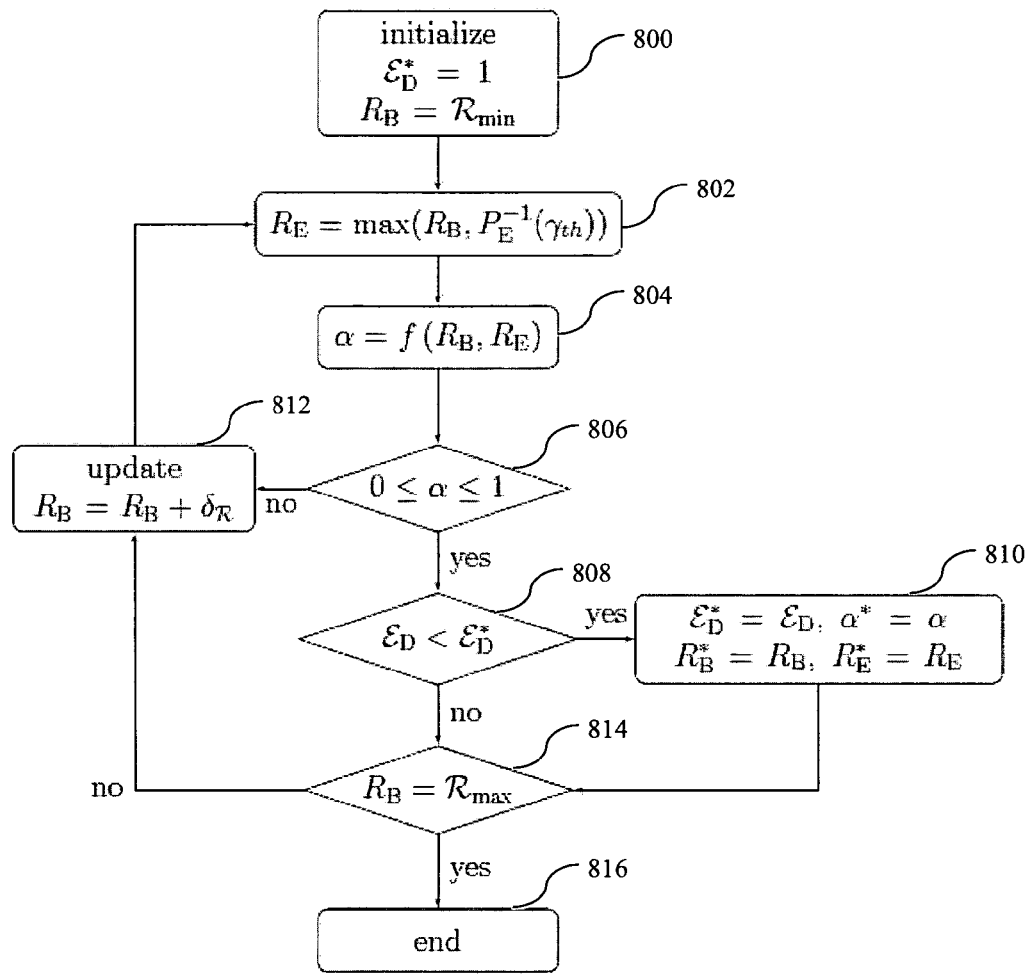
FIG. 8 is a flowchart of the disclosed optimization framework for progressive transmission.

The flowchart of the algorithm for progressive transmission is shown in FIG. 8. In step 800, the base layer rate is initialized as $R_B = \mathcal{R}_{min}$ and the expected distortion $\epsilon_D^* = 1$, where SNR denotes average transmit signal-to-noise ratio. The enhancement layer rate $R_E$, which is associated with a preset $P_E = \gamma$th, is determined in step 802 from the inverse function of $P_E$, i.e. $R_E = \max(R_B, P_E^{-1}(\gamma\text{th}))$. The maximum operation is used to ensure that $R_E \geq R_B$ since the enhancement layer is useless if the base layer is in outage. Then, $\alpha$ (which determines the channel uses $\alpha L$ and $(1-\alpha)L$) is calculated in step 804 from a closed-form expression as follows:

$$\alpha = f(R_B, R_E) \quad (18)$$
$$= \frac{1}{bR_E}\log_2\frac{(1-P_E)(R_E - R_B)}{(P_E - P_B)R_B}.$$

The value of $\alpha$ is checked in step 806 to ensure it is in the range $0 \leq \alpha \leq 1$. If it is, the corresponding expected distortion value is checked in step 808 to see if it is lower than the initialized expected distortion value. If it is, the new expected distortion value is set as the initialized expected distortion value, and the corresponding $R_B$, $R_E$ and $\alpha$ values are saved in step 810 as the optimal values $R_B^*$, $R_E^*$, and $\alpha^*$. The method then proceeds to step 814 to check if $R_B = \mathcal{R}_{max}$. If yes, the method ends at step 816. Otherwise, the method proceeds to step 812 to increase the base layer rate to $R_B + \delta_\mathcal{R}$ and to repeat steps 802 onwards. Similarly, if in step 806 it is determined that the value of $\alpha$ is not within the specified range, the method proceeds to step 812 to increase the base layer rate to $R_B + \delta_\mathcal{R}$ and to repeat steps 802 onwards.

If in step 808 it is determined that the expected distortion value is not lower than the last initialized expected distortion value, the method proceeds to step 814 to determine if $R_B = \mathcal{R}_{max}$. Assuming this is not so, the method proceeds to step 812 to increase the base layer rate to $R_B + \delta_\mathcal{R}$ and to repeat steps 802 onwards. If, however, $R_B = \mathcal{R}_{max}$, the method ends in step 816.

As will be appreciated from the flowchart of FIG. 8, the method is repeated by increasing the base layer rate to $R_B + \delta_\mathcal{R}$ until $R_B = \mathcal{R}_{max}$ and until the optimal $R_B^*$, $R_E^*$, and $\alpha^*$ values which minimize the expected distortion $\epsilon_D$ in (4) are attained.

3.3 Optimization for Superposition Coding

Figure 9:
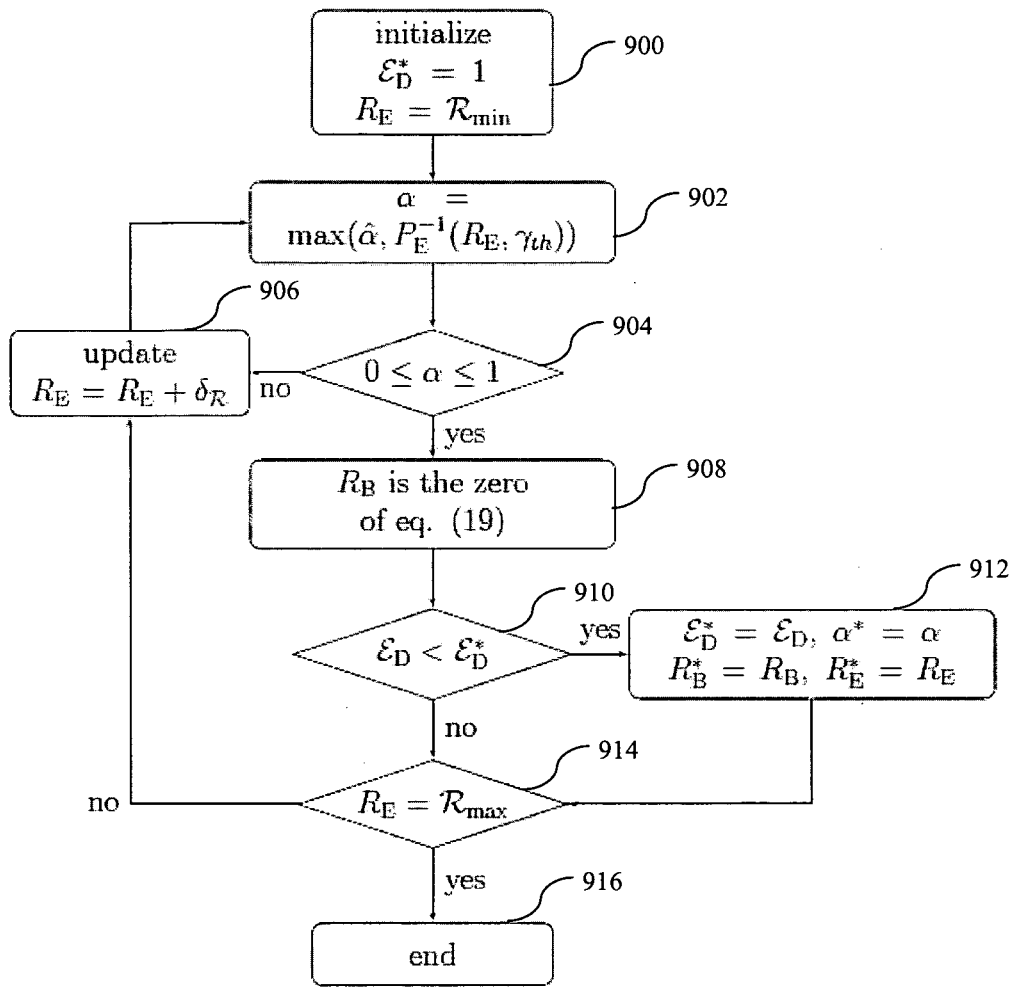
FIG. 9 is a flowchart of the disclosed optimization framework for superposition coding.

The flowchart of the algorithm for superposition coding is shown in FIG. 9. The method begins at step 900 where the enhancement layer rate is initialized as $R_E = \mathcal{R}_{min}$ and the expected distortion $\epsilon_D^* = 1$. Since the outage probability of the enhancement layer is a function of $R_E$ and $\alpha$, $\alpha$ (which is associated with a preset $P_E = \gamma$th and $R_E$ and which determines the transmit power $\alpha P_S$ and $(1-\alpha)P_S$)) can be calculated from the inverse function of $P_E$, i.e. $\alpha = P_E^{-1}(R_E, \gamma\text{th})$.

However, this may result in most of the power being allocated to the enhancement layer, resulting in $P_E \leq P_B$ which then causes an increase in the expected distortion. To prevent this, the constraint $\alpha \geq \hat{\alpha}$, i.e. $\alpha = \max(\hat{\alpha}, P_E^{-1}(R_E, \gamma\text{th}))$ is applied in step 902 where $\hat{\alpha}$ is the minimum power level for the base layer such that $P_B \leq P_E$.

The value of $\alpha$ is checked in step 904 to ensure it is in the range $0 \leq \alpha \leq 1$. If it is not, the method proceeds to step 906 to increase the enhancement layer rate to $R_E = R_E + \delta_\mathcal{R}$ and to repeat steps 902 onwards.

If the value of $\alpha$ is within the specified range, $R_B$ is then calculated in step 908. Given $R_E$ and $\alpha$, the optimal base layer rate $R_B$ that minimizes in $\epsilon_D$ (5) is the solution of $$\frac{d\epsilon_D}{dR_B} = 0.$$

In other words, the optimal $R_B$ is the zero of the following equation:

$$(\alpha - (1-\alpha)(2^{c_2 R_B} - 1))^{N+1} - \frac{c_1 c_2 \alpha N}{bc_3 P_S^N}2^{(c_2+b)R_B}(2^{c_2 R_B}-1)^{N-1} = 0, \quad (19)$$

where $P_B \ll P_B$ is assumed, $c_1$ and $c_2$ are constants that depend on the relaying strategy as given in Table 1 below and $c_3 = (1-P_E)2^{-bR_E}$. The $R_B$ optimization problem can be solved by using a zero-finding algorithm with much less computational complexity than an exhaustive search.

TABLE 1

The value of $c_1$ and $c_2$ in eq. (19).

| strategy | $c_1$ | $c_2$ |
|---|---|---|
| OAF | $\prod_{n=1}^{N}\left[\frac{1}{\sigma_{s,n}^2} + \frac{1}{\sigma_{n,d}^2}\right]$ | N + 1 |
| SEL | $\prod_{n=1}^{N}\left[\frac{1}{\sigma_{s,n}^2} + \frac{1}{\sigma_{n,d}^2}\right]$ | 2 |
| DBF | $\frac{1}{N!}\prod_{n=1}^{N}\left[\frac{1}{\sigma_{s,n}^2} + \frac{1}{\sigma_{n,d}^2}\right]$ | 2 |

Once $R_B$ is obtained, the method proceeds to step 910 to check the corresponding expected distortion value to see if it is lower than the initialized expected distortion value. If it is, the new expected distortion value is set as the initialized expected distortion value, and the corresponding $R_B$, $R_E$ and $\alpha$ values are saved in step 912 as optimal values and $R_B^*$, $R_E^*$, and $\alpha^*$. The method then proceeds to step 914 to check if $R_E = \mathcal{R}_{max}$. If yes, the method ends at step 916. Otherwise, the method proceeds to step 906 to increase the enhancement layer rate to $R_E = R_E + \delta_\mathcal{R}$ and to repeat steps 902 onwards.

As can be seen from the flowchart of FIG. 9, the method is repeated until $R_E = \mathcal{R}_{max}$ and until the optimal $R_B^*$, $R_E^*$, $\alpha^*$ values which minimize the expected distortion $\epsilon_D$ in (5) are attained.

Figure 10A:
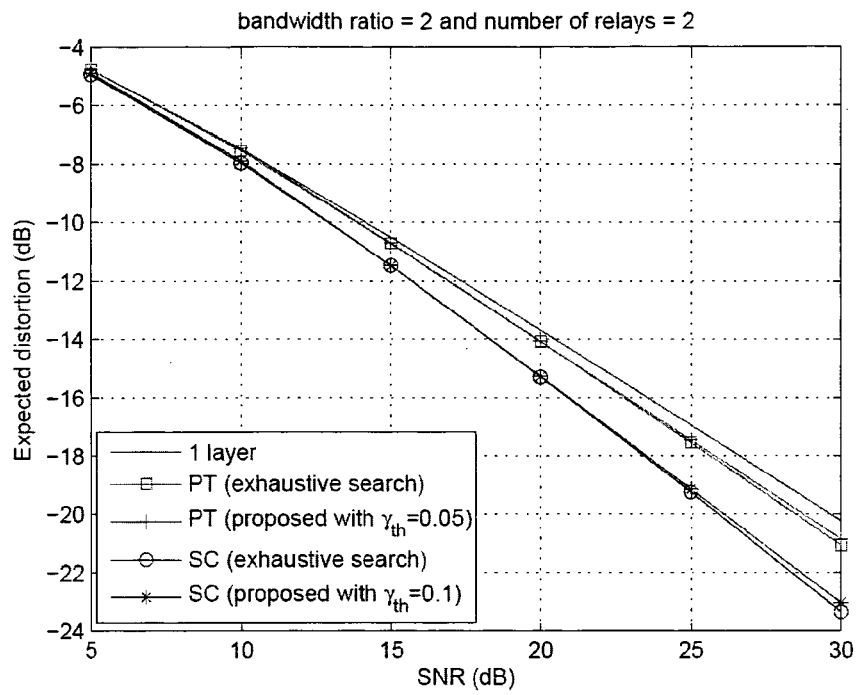
FIGS. 10A and 10B are graphs showing expected distortion resulting from the proposed optimization framework as compared to an exhaustive search for the SEL scheme.
Figure 10B:
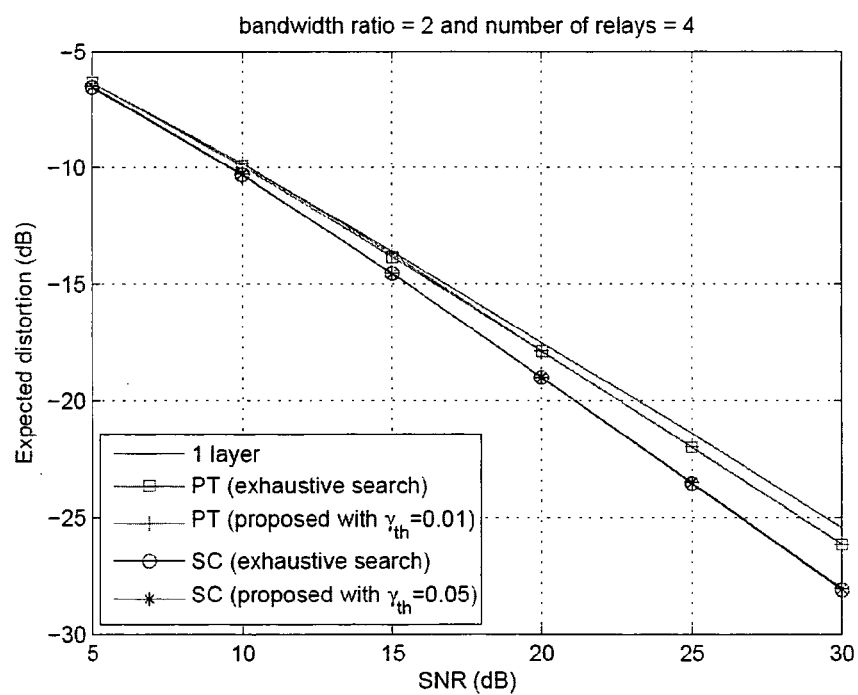
Figure 11:
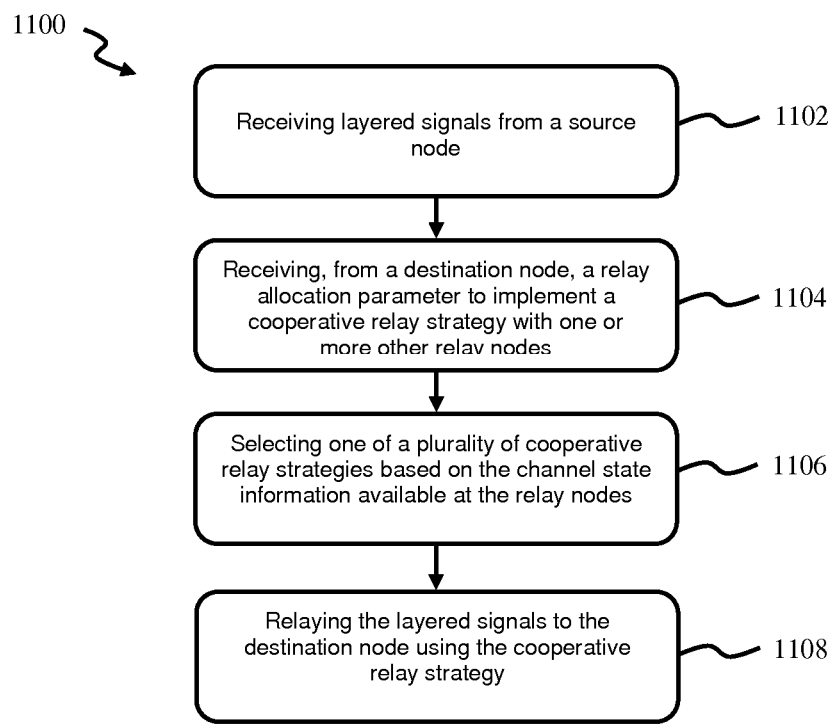
FIG. 11 is a flowchart of a method performed by a relay node for wireless transmission of layered signals in a relay network.
Figure 12:
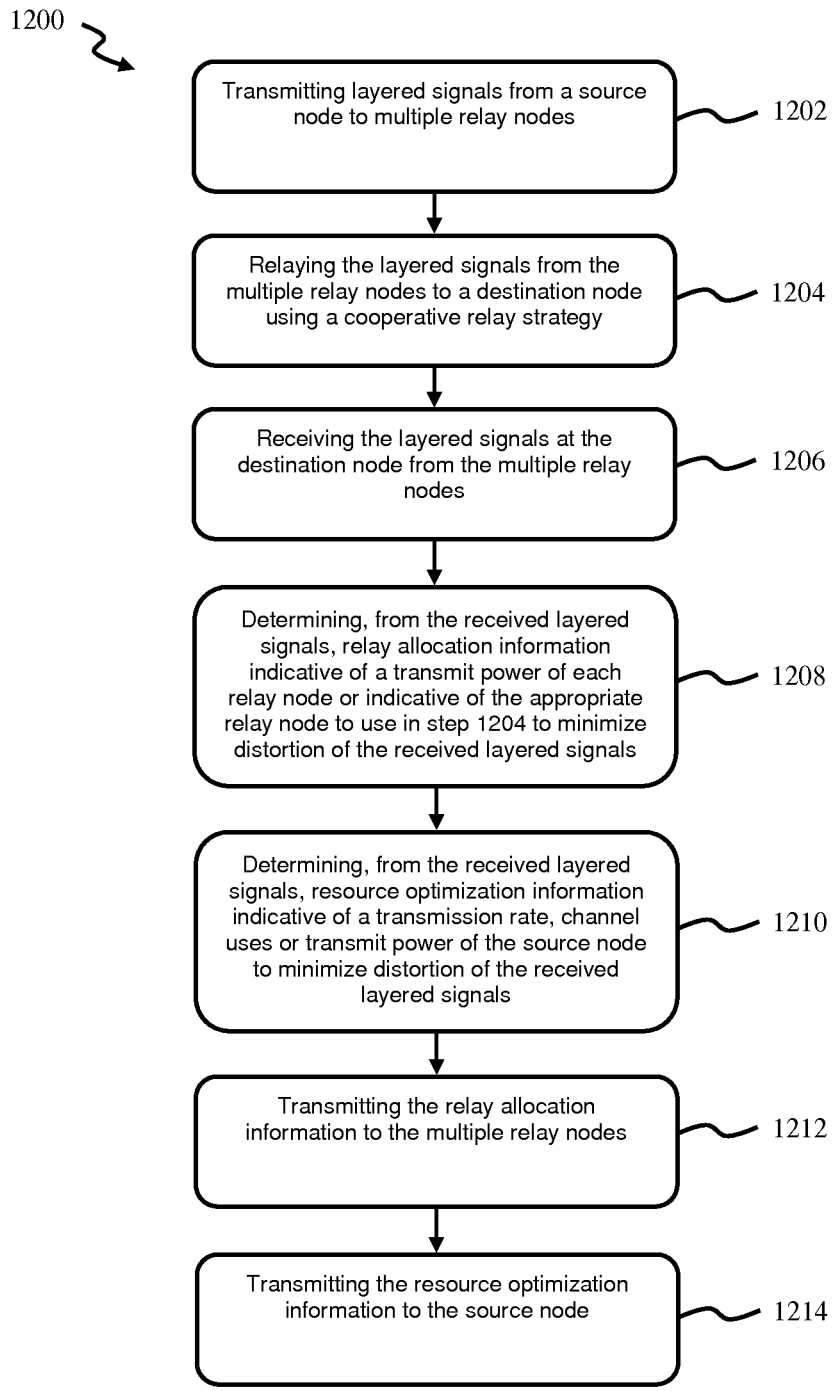
FIG. 12 is a flowchart of a method of wireless transmission of layered signals in a relay network.
Figure 13:
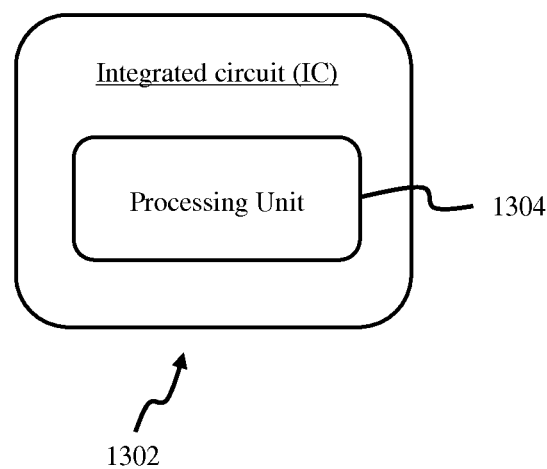
FIG. 13 is a schematic diagram of an integrated circuit (IC) for a relay node to relay layered signals from a source node to a destination node.
Figure 14:
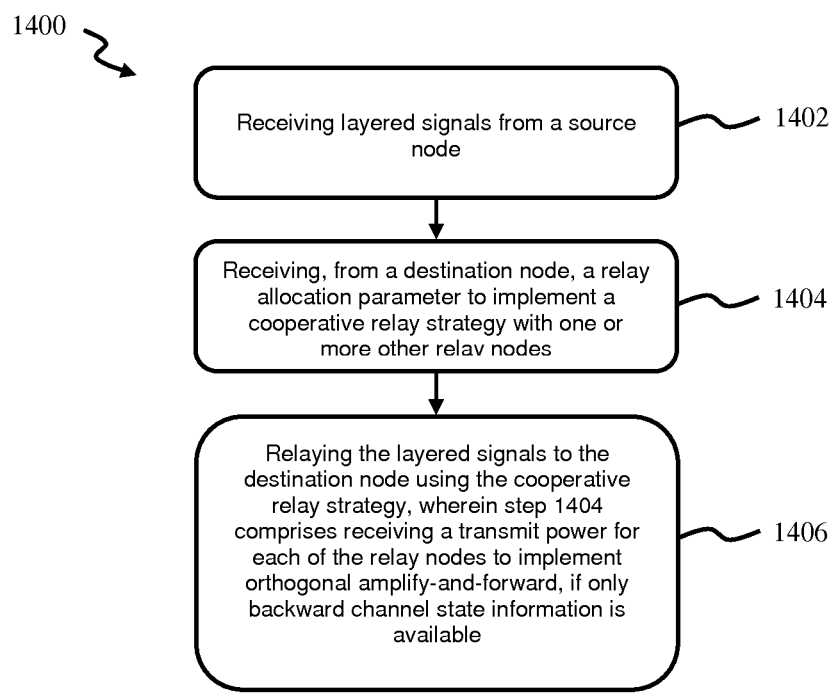
FIG. 14 is a flowchart of a method performed by a relay node for wireless transmission of layered signals in a relay network, according to another embodiment.
Figure 15:
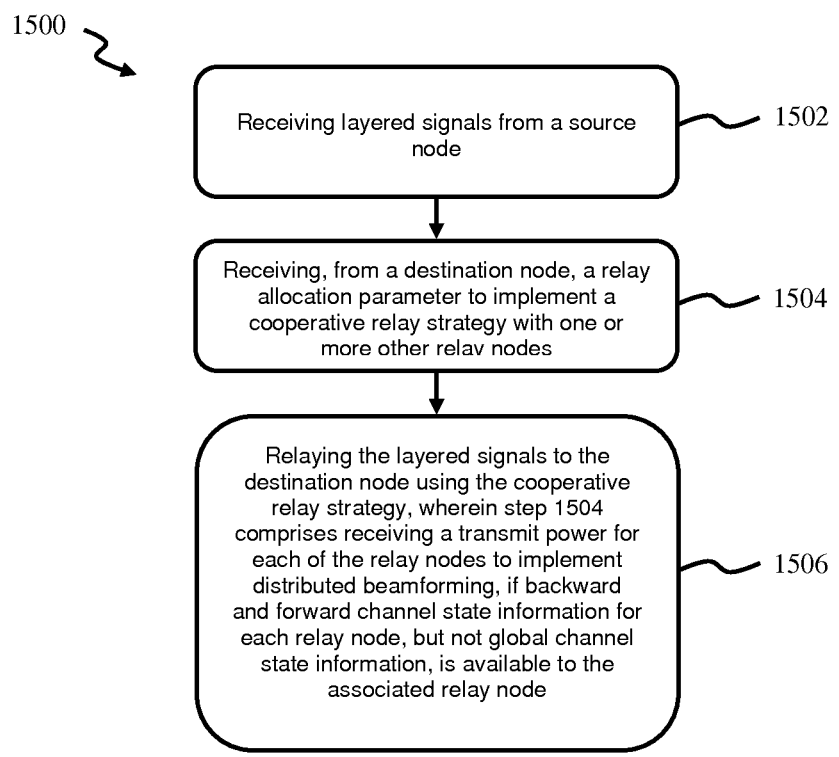
FIG. 15 is a flowchart of a method performed by a relay node for wireless transmission of layered signals in a relay network, according to a further embodiment.
Figure 16:
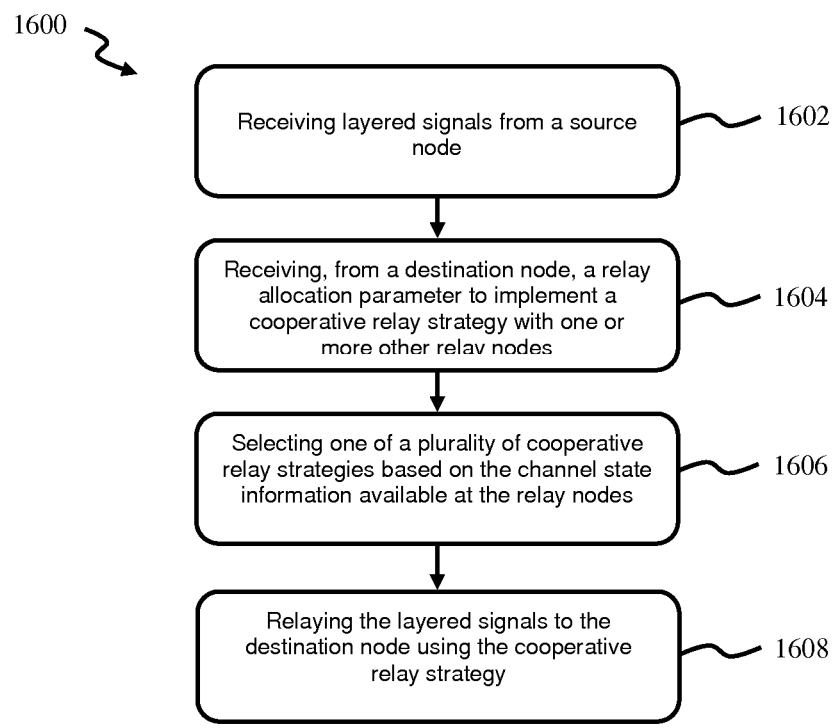
FIG. 16 is a flowchart of a method performed by a relay node for wireless transmission of layered signals in a relay network.

Example expected distortion values from the above optimization framework as compared to known exhaustive search techniques are shown in the graphs of FIGS. 10A and 10B. Both graphs show $\epsilon_D$ values for the transmission of one layer and two layers with progressive transmission and superposition coding schemes. For each of the layered schemes, the exhaustive search technique and the above optimization techniques were applied. FIG. 10A shows the results where two relay nodes are used, while FIG. 10B shows the results where four relay nodes are used. In essence, the performance of the proposed optimization framework is comparable to the exhaustive search technique, but the advantage of the proposed optimization technique lies in its reduced computational complexity ($\mathcal{O}(|\mathcal{R}|)$ as opposed to $\mathcal{O}(2|\mathcal{R}|)$).

It will be appreciated from the above that the preferred embodiment of the present invention provides a framework and methodology of layered video transmission over a multiple-relay network. The resulting advantages include increasing the coverage range and enhancing the quality of received video by virtue of exploiting the spatial diversity of the multiple relays, and relying on layered coding for transmission reliability. A summary of the preferred embodiment framework and methodology follows.

At the source node, either progressive transmission or superposition coding is used as the layered video transmission strategy. These SRC type strategies are used since the quality of the received video is significantly improved when the number of decoded layers is high and it has lower coding complexities. In the preferred embodiment, it is assumed that the video signal is encoded into only two layers, i.e. base and enhancement layers; since the maximum layering gain can be achieved with only encoding two layers and the overhead and the complexity of the encoder/decoder is moderate. These different layers are transmitted at different transmission rates and different channel uses or transmitted with different power depending on the layered source strategy. Of course more layers may be provided where necessary or desired.

At the multiple relay nodes, amplify-and-forward (non-regenerative) relaying is used to implement cooperative relay strategies to reduce the processing delay at the relay nodes. Three cooperative relay strategies depending on the type of CSI at the relay nodes may be used: OAF, SEL and DBF. Due to the delay constraints in video transmissions, the preferred embodiment uses non-regenerative schemes at the relay nodes, which is simpler and requires low-complexity processing compared to other schemes. However, this is not limiting and other schemes (e.g. decode-and-forward) may be used where there is little or no delay constraint.

At the destination node, a relay allocation algorithm is performed and relay allocation parameters are fed back to the relay nodes. In addition, resource optimization with preset enhancement layer outage probability is applied and resource optimization parameters are sent back to the source node to reduce the optimization complexity for the layered-source transmission. The resource optimization algorithm assigns rate, power, and channel uses to different layers efficiently so as to maximize the quality of the reconstructed video. The proposed optimization methodology is simple and only requires knowledge of the channel statistics for computation of the optimal resources. As a result, the destination node only requires to feedback the optimal rate, power, and channel uses to the source node whenever the channel statistics or the layered video strategies changes. Also, although the performance of the proposed optimization framework is comparable to those previously proposed, the algorithms have a much lower computational complexity ($\mathcal{O}(|\mathcal{R}|)$ as opposed to $\mathcal{O}(2|\mathcal{R}|)$).

The above framework and corresponding methodologies may be used for any wireless video transmission over relay networks, which include any future wireless system incorporated with relays e.g. LTE (Long Term Evolution) Advanced systems or 4G systems. This is because the preferred embodiment exploits the spatial diversity in multiple relay networks to increase the coverage area as well as to improve the link reliability in wireless video transmission service, which are applicable for any future wireless system that includes relays. The cooperative and optimization framework can also be applied in IP television (IPTV) services and multimedia broadcast services (MBMS), where it involves the transmission of multiple classes of layered signals over wireless cellular systems. In such applications, different contexts are transmitted in layering format by way of either the progressive or superposition scheme. As such, the present optimization framework can be directly applied to such layering applications. Moreover, wireless relay nodes are inevitably going to be a part of future cellular networks. The proposed framework will continue to be useful for such services over these future cellular networks.

The foregoing describes preferred embodiments, which, as will be understood by those skilled in the art, may be subject to variations or modifications in design, construction or operation without departing from the scope of the claims. For example, while the preferred embodiment has been described with reference to relaying video transmissions, this is not limiting. Where desired, signals other than video signals may be transmitted. Moreover, it is possible to change the cooperative relay strategy on-the-fly by recalculating the relevant parameters, and all nodes acquiring the required channel knowledge and synchronizing accordingly. Furthermore, although the invention has been described from a 'no direct link' viewpoint (i.e. there is no direct link between the source and destination nodes, and all communication is via the relay nodes), skilled persons will appreciate that the invention can be implemented where there is a direct link. In such cases, the cooperative relay strategy of the invention may be used to improve the reception of direct link signals via cooperative diversity.

Skilled persons will also appreciate that the steps of the preferred embodiment method may be implemented as modules in hardware, for instance using individual or separate processors or processing units programmed to carry out the disclosed method steps. The steps may alternatively be implemented in software, as a series of instructions which, when executed by a processor or other computing device, perform the same function as the hardware embodiment. A combination of hardware and software implementation may also be used. For instance, a hardware arrangement may be configured to read, from a computer readable medium, executable instructions for implementing the disclosed method in the hardware arrangement.

The above variations, for instance, are intended to be covered by the scope of the claims.

What is claimed is:

1. A method performed by a relay node for wireless transmission of layered signals in a relay network, the method comprising:
  (i) receiving layered signals from a source node,
  (ii) receiving, from a destination node, a relay allocation parameter to implement a cooperative relay strategy with one or more other relay nodes, and
  (iii) relaying the layered signals to the destination node using the cooperative relay strategy, wherein
    the method further comprises, prior to operation (iii), selecting one of a plurality of cooperative relay strategies based on the channel state information available at the relay nodes, which includes selecting orthogonal amplify-and-forward to be performed by every relay node or selective relaying to be performed by a relay node having the largest product of backward and forward channel state information if only backward channel state information is available, or selecting distributed beamforming to be performed by every relay node if backward and forward channel state information for each relay node, but not global channel state information, is available to an associated relay node.

2. The method according to claim 1, wherein operation (ii) comprises receiving a transmit power for each of the relay nodes to implement orthogonal amplify-and-forward.

3. The method according to claim 1, wherein operation (ii) comprises receiving a relay index indicating which one of the relay nodes should be used to implement selective relaying.

4. The method according to claim 1, wherein operation (ii) comprises receiving a value for use by each of the relay nodes to calculate their transmit power to implement distributed beamforming.

5. A method of processing layered signals received at a destination node from multiple relay nodes, the multiple relay nodes implementing a cooperative relay strategy to relay layered signals from a source node, the method comprising:
   (i) determining channel state information from the received layered signals,
   (ii) determining which one of a plurality of cooperative relay strategies is implemented by the multiple relay nodes,
   (iii) determining, using the channel state information, a relay allocation parameter to control the cooperative relay strategy implemented by the multiple relay nodes, and
   (iv) sending the relay allocation parameter to the multiple relay nodes; wherein the method further comprising:
   (v) determining if there has been a change in channel state information, and
   (vi) if there has been a change in channel state information, determining a resource optimization parameter to control the generation of layered signals at the source node so as to minimize expected distortion at the destination node, and
   (vii) sending the resource optimization parameter to the source node; and
   wherein the resource optimization parameter comprises a base layer transmission rate, an enhancement layer transmission rate, and one of:
   channel allocation for the base and enhancement layers, or transmit power for the base and enhancement layers.

6. The method according to claim 5, wherein operation (iii) comprises calculating a transmit power for each of the multiple relay nodes to implement orthogonal amplify-and-forward.

7. The method according to claim 5, wherein operation (iii) comprises calculating a relay index indicating which one of the multiple relay nodes should be used to implement selective relaying.

8. The method according to claim 5, wherein operation (iii) comprises calculating a value for use by each of the multiple relay nodes to calculate their transmit power to implement distributed beamforming.

9. The method according to claim 5, wherein operation (vi) comprises presetting an outage probability of the enhancement layer, and determining, from the preset outage probability, the base layer transmission rate, enhancement layer transmission rate and one of channel uses and transmit power to be implemented at the source node to minimize expected distortion at the destination node.

10. The method according to claim 9, wherein the layered signals are progressive transmission signals, and wherein operation (vi) further comprises:
   (a) initializing the base layer transmission rate at a minimum transmission rate,
   (b) determining the enhancement layer transmission rate from the preset outage probability and the base layer transmission rate,
   (c) determining the channel uses using the determined base layer transmission rate and enhancement layer transmission rate,
   (d) determining the expected distortion using the determined base layer transmission rate, enhancement layer transmission rate and the channel uses,
   (e) increasing the base layer transmission rate,
   (f) repeating operations (b) to (e) until the base layer transmission rate is at a maximum transmission rate, and
   (g) determining which values of the base layer transmission rate, enhancement layer transmission rate and channel uses result in a minimum expected distortion.

11. The method according to claim 9, wherein the layered signals are superposition coding layered signals, and wherein operation (vi) further comprises:
   (a) initializing the enhancement layer transmission rate at a minimum transmission rate,
   (b) determining the transmit power using the enhancement layer transmission rate and the preset outage probability,
   (c) determining the base layer transmission rate,
   (d) determining the expected distortion using the determined base layer transmission rate, enhancement layer transmission rate and transmit power,
   (e) increasing the enhancement layer transmission rate,
   (f) repeating operations (b) to (e) until the enhancement layer transmission rate is at a maximum transmission rate, and
   (g) determining which values of the base layer transmission rate, enhancement layer transmission rate and transmit power result in a minimum expected distortion.

12. A method of wireless transmission of layered signals in a relay network, the method comprising:
   (i) transmitting layered signals from a source node to multiple relay nodes,
   (ii) relaying the layered signals from the multiple relay nodes to a destination node using a cooperative relay strategy,
   (iii) receiving the layered signals at the destination node from the multiple relay nodes,
   (iv) determining, from the received layered signals, relay allocation information indicative of a transmit power of each relay node or indicative of the appropriate relay node to use in operation (ii) to minimize distortion of the received layered signals,
   (v) determining, from the received layered signals, resource optimization information indicative of a transmission rate, channel uses or transmit power of the source node to minimize distortion of the received layered signals,
   (vi) transmitting the relay allocation information to the multiple relay nodes, and
   (vii) transmitting the resource optimization information to the source node, wherein operation (ii) comprises implementing one of: orthogonal amplify-and-forward to be performed by every relay node, selective relaying to be performed by a relay node having the largest product of backward and forward channel state information if only backward channel state information is available, and distributed beamforming to be performed by every relay node if backward and forward channel state information for each relay node, but not global channel state information, is available to the associated relay node.

13. The method according to claim 12, wherein the layered signals comprise a base layer and an enhancement layer, and wherein operation (v) comprises presetting an outage probability of the enhancement layer, and determining, from the preset outage probability, the base layer transmission rate, enhancement layer transmission rate and one of channel uses and transmit power to be implemented by the source node to minimize expected distortion at the destination node.

14. The method according to claim 13, wherein the layered signals are progressive transmission signals, and wherein operation (v) further comprises:
(a) initializing the base layer transmission rate at a minimum transmission rate,
(b) determining the enhancement layer transmission rate from the preset outage probability and the base layer transmission rate,
(c) determining the channel uses using the determined base layer transmission rate and enhancement layer transmission rate,
(d) determining the expected distortion using the determined base layer transmission rate, enhancement layer transmission rate and channel uses,
(e) increasing the base layer transmission rate,
(f) repeating operations (b) to (e) until the base layer transmission rate is at a maximum transmission rate, and
(g) determining which values of the base layer transmission rate, enhancement layer transmission rate and channel uses result in a minimum expected distortion.

15. The method according to claim 13, wherein the layered signals are superposition coding layered signals, and wherein operation (v) further comprises:
(a) initializing the enhancement layer transmission rate at a minimum transmission rate,
(b) determining the transmit power using the enhancement layer transmission rate and the preset outage probability,
(c) determining the base layer transmission rate,
(d) determining the expected distortion using the determined base layer transmission rate, enhancement layer transmission rate and transmit power,
(e) increasing the enhancement layer transmission rate,
(f) repeating operations (b) to (e) until the enhancement layer transmission rate is at a maximum transmission rate, and
(g) determining which values of the base layer transmission rate, enhancement layer transmission rate and transmit power result in a minimum expected distortion.

16. An integrated circuit (IC) for a relay node to relay layered signals from a source node to a destination node, the IC comprising:
(i) a hardware processing unit configured to
receive layered signals from the source node,
receive, from the destination node, a relay allocation parameter to implement a cooperative relay strategy with one or more other relay nodes,
select one of a plurality of cooperative relay strategies based on the channel state information available at the relay nodes, which includes selecting orthogonal amplify-and-forward to be performed by every relay node or selective relaying to be performed by a relay node having the largest product of backward and forward channel state information if only backward channel state information is available, or selecting distributed beamforming to be performed by every relay node if backward and forward channel state information for each relay node, but not global channel state information, is available to an associated relay node, and
relay the layered signals to the destination node using the selected cooperative relay strategy.

17. An integrated circuit (IC) for a destination node to process received layered signals from multiple relay nodes, the IC comprising:

(i) a relay allocation hardware processing unit configured to
determine the cooperative relay strategy implemented by the multiple relay nodes,
determine, using channel state information derived from the received layered signals, a relay allocation parameter to control the cooperative relay strategy, and
send the relay allocation parameter to the multiple relay nodes,
wherein the IC further comprises
(ii) a resource optimization hardware processing unit configured to
preset an outage probability of an enhancement layer of the layered signals,
determine, from the preset outage probability, a base layer transmission rate, enhancement layer transmission rate and one of channel uses and transmit power to be implemented by a source node to minimize expected distortion at the destination node, and
send the base layer transmission rate, enhancement layer transmission rate and one of the channel uses and the transmit power to the source node.

18. A method performed by a relay node for wireless transmission of layered signals in a relay network, the method comprising:
(i) receiving layered signals from a source node,
(ii) receiving, from a destination node, a relay allocation parameter to implement a cooperative relay strategy with one or more other relay nodes, and
(iii) relaying the layered signals to the destination node using the cooperative relay strategy, wherein operation (ii) comprises receiving a transmit power for each of the relay nodes to implement orthogonal amplify-and-forward, if only backward channel state information is available.

19. A method performed by a relay node for wireless transmission of layered signals in a relay network, the method comprising:
(i) receiving layered signals from a source node,
(ii) receiving, from a destination node, a relay allocation parameter to implement a cooperative relay strategy with one or more other relay nodes, and
(iii) relaying the layered signals to the destination node using the cooperative relay strategy, wherein operation (ii) comprises receiving a value for use by each of the relay nodes to calculate their transmit power to implement distributed beamforming, if backward and forward channel state information channel state information for each relay node, but not global channel state information, is available to an associated relay node.

20. A method performed by a relay node for wireless transmission of layered signals in a relay network, the relay node being configured to communicate with a plurality of communication devices in the relay network, the method comprising:
(i) receiving layered signals from a source node,
(ii) receiving, from a destination node, a relay allocation parameter to implement a cooperative relay strategy with one or more other relay nodes, and
(iii) relaying the layered signals to the destination node using the cooperative relay strategy, wherein
the method further comprises, prior to operation (iii), selecting one of a plurality of cooperative relay strategies based on the channel state information available at the relay nodes, which includes selecting orthogonal amplify-and-forward to be performed by every relay node or selective relaying to be performed by a relay node having the largest product of backward and forward channel state information if only backward channel state information is available, or selecting distributed beamforming to be performed by every relay node if backward and forward channel state information for each relay node, but not global channel state information, is available to an associated relay node.

21. A method performed by a communication device for processing layered signals in a relay network, the relay node being configured to communicate with a relay node, the multiple relay nodes implementing a cooperative relay strategy to relay layered signals from a source node, the method comprising:
(i) determining channel state information from the received layered signals,
(ii) determining which one of a plurality of cooperative relay strategies is implemented by the multiple relay nodes,
(iii) determining, using the channel state information, a relay allocation parameter to control the cooperative relay strategy implemented by the multiple relay nodes, and
(iv) sending the relay allocation parameter to the multiple relay nodes; wherein the method further comprising:
(v) determining if there has been a change in channel state information, and if there has been a change in channel state information, determining a resource optimization parameter to control the generation of layered signals at the source node so as to minimize expected distortion at the destination node, and
(vii) sending the resource optimization parameter to the source node;
and wherein the resource optimization parameter comprises a base layer transmission rate, an enhancement layer transmission rate, and one of:
channel allocation for the base and enhancement layers, or transmit power for the base and enhancement layers.

* * * * *